(12) United States Patent
Hobelsberger et al.

(10) Patent No.: US 6,714,020 B2
(45) Date of Patent: Mar. 30, 2004

(54) PROTECTIVE AND MONITORING APPARATUS FOR A GENERATOR, AND USE OF SUCH A PROTECTIVE AND MONITORING APPARATUS

(75) Inventors: Max Hobelsberger, Wuerenlingen (CH); Ingo Kirchhofff, Zurich (CH); René Kohler, Schinznach-Bad (CH); Zlatimir Posedel, Neuenhof (CH)

(73) Assignee: ALSTOM Technology Ltd, Baden (CH)

( * ) Notice: Subject to any disclaimer, the term of this patent is extended or adjusted under 35 U.S.C. 154(b) by 56 days.

(21) Appl. No.: 10/200,282

(22) Filed: Jul. 23, 2002

(65) Prior Publication Data

US 2003/0020482 A1 Jan. 30, 2003

(30) Foreign Application Priority Data

Jul. 27, 2001 (CH) ................................................ 1401/01

(51) Int. Cl.[7] .............................................. G01R 31/08
(52) U.S. Cl. ........................................ 324/525; 310/83
(58) Field of Search ............................ 324/525; 310/83, 310/248

(56) References Cited

U.S. PATENT DOCUMENTS 3,581,150 A * 5/1971 Kirk et al. ..................... 361/18
4,831,295 A     5/1989 Posedel
5,006,769 A * 4/1991 Posedel ......................... 318/434
5,677,831 A * 10/1997 Lin ................................ 363/24

FOREIGN PATENT DOCUMENTS

| DE | 3511755 A1 | * 10/1985 | ............ H02K/5/16 |
| DE | 517568.4 | 8/1986 | |
| DE | 0391181 A2 | * 3/1990 | ........... G01R/31/06 |
| DE | 19742622 A1 | 4/1999 | |
| EP | 0271678 B1 | 6/1988 | |
| WO | WO 99/17433 | * 4/1999 | .......... H02K/19/36 |

* cited by examiner

Primary Examiner—Charles H. Nolan, Jr.
(74) Attorney, Agent, or Firm—Burns, Doane, Swecker & Mathis, L.L.P.

(57) ABSTRACT

A protective and monitoring apparatus (20, 23) for monitoring and reducing shaft currents and shaft voltages on the generator shaft (19) of a generator (16) which produces electrical power, which protective and monitoring device (20, 23) is connected between a contact apparatus (21, 24), which makes contact with the generator shaft (19), and a grounding connection (22, 25) and comprises a parallel circuit formed by a resistance and a capacitance, with one end of the parallel circuit (26, 27) being connected to the contact apparatus (21, 24) and its other end being connected to the grounding connection (22, 25), said parallel circuit being protected against overvoltages on the generator shaft (19) and means (31) being provided for bridging the parallel circuit (26, 27) when an overvoltage occurs.

11 Claims, 2 Drawing Sheets

US 6,714,020 B2

PROTECTIVE AND MONITORING APPARATUS FOR A GENERATOR, AND USE OF SUCH A PROTECTIVE AND MONITORING APPARATUS

This application claims priority under 35 U.S.C. §§119 and/or 365 to Application No. 2001 1401/01 filed in Switzerland on Jul. 27, 2001; the entire content of which is hereby incorporated by refernce.

FIELD OF THE INVENTION

The present invention relates to the technical field of generators for producing electrical power. It relates in particular to a protective and monitoring apparatus for a generator as claimed in the precharacterizing clause of claim 1, and to the use of such a protective and monitoring apparatus.

BACKGROUND OF THE INVENTION

A protective and monitoring apparatus of said type is known, of example, from the document EP-A1-0 271 678.

As described in the document EP-A1-0 271 678 mentioned initially and in the subsequent document DE-A1-197 42 622, shaft voltages and shaft currents can occur for various reasons on the generator shaft of a generator, which is normally part of a turbine set, whose frequency spectrum extends from direct current up to frequencies which are related to the rotation frequency of the generator, its method of construction (number of pole pairs) and to the frequencies of the generator excitation system.

The shaft voltages and shaft currents represent a danger to various components of the generator and can lead to damage to the generator if they are not reduced to a tolerable extent or no protective measures are taken. To this end, special precautions have been taken in the past on the generator shaft by, for example, installing isolating gaps at the non drive end of the generator and by connecting the generator shaft via brushes or copper blades to ground potential at the drive end. In order to ground high-frequency voltages in a controlled manner, it has also been proposed for the non drive end of the generator shaft to be AC-coupled via a capacitance to the ground potential, by means of a sliding contact.

The shaft voltages and shaft currents may, however, also be used to monitor the functional reliability and serviceability of the shaft run and of the shaft grounding. The document EP-A1-0 271 678 mentioned initially in this context describes a monitoring and evaluation circuit which creates a current path by connecting a resistance in parallel with a discharge capacitance at the non drive end of the generator by evaluating frequency components which are typical of the machine in the currents flying through this path. The RC combination provides a reliable connection between the shaft and ground potential, reduces not only static charges but also low-frequency currents and relatively high-frequency voltages to levels which, for example, are not dangerous for the shaft bearings. The introduction of parallel resistance could even mean that there is no need for resistive grounding at the drive end.

Another proposal (DE-A1-0 197 42 622) comprises measuring the shaft current, which flows through the grounding path of the generator shaft, at the drive end and of determining the waveform or frequency of the shaft current, from which the cause of the shaft current can then be derived.

Both high currents and high voltages can occur in the grounding path, and must be coped with. EP-A1-0 271 678 proposes a series-connected fuse in order to switch excessively high currents. However, no precautions are taken against excessively high voltages, such as those which occur when the generator shaft comes into contact with a low-impedance high-voltage source.

DE-A1-197 42 622 does not take any precautions either against excessively high currents or against excessively high voltages.

SUMMARY OF THE INVENTION

One object of the invention is thus to provide a protective and monitoring apparatus for a generator shaft, which overcomes the disadvantages of the previous solutions and, while at the same time having a simple design and versatile applicability, is protected against overvoltages on the generator shaft, as well as specifying an advantageous use for the protective and monitoring apparatus.

The object is achieved by the totality of the features of claims 1 and 9. The essence of the invention is to provide at least one means for bridging the RC parallel circuit, which deliberately short-circuit the RC parallel circuit when overvoltage occurs on the generator shaft, thus reducing the voltage dropped across the apparatus to a tolerable level.

According to a first preferred refinement of the invention, a measurement resistance is connected in series with the parallel circuit, between the parallel circuit and the grounding connection, and in that the series of circuits formed by the measurement resistance and the parallel circuit can be bridged by the bridging means. This makes it possible to measure the shaft current flowing away to ground in a simple manner, and allows not only its time profile but also the frequencies which occur to be evaluated and to be used for monitoring the shaft grounding.

In order to achieve protection against excessive currents, it is advantageous if, according to a second refinement of the invention, a fuse is connected in series with the parallel circuit, between the parallel circuit and the contact apparatus, and if the series circuit formed from the measurement resistance, the parallel circuit and the fuse can be bridged by the bridging means. In this case, it has been proven to be advantageous for the fuse to have rated value of approximately 2A.

In order that static charges can still be dissipated from the generator shaft to ground even after the fuse has blown, it is expedient, according to a further refinement of the invention, for a high-value resistance to be connected in parallel with the fuse.

The overvoltage protection is particularly safe and requires little maintenance if the bridging means comprise a controllable switching element, in particular a triac, which is preferably switched on when the voltage which is dropped across the protective monitoring device exceeds approximately 32 V.

One preferred use is characterized in that the voltage which is dropped across the protective and monitoring apparatus is limited by switching on the bridging means when said voltage exceeds a predetermined value.

In particular, the voltage which is dropped across the protective monitoring apparatus and/or the current which is flowing through the protective and monitoring apparatus is measured, and its time profile and the frequency distribution which occurs are evaluated.

BRIEF DESCRIPTION OF THE DRAWINGS

The invention will be explained in more detail in the following text with reference to exemplary embodiments in conjunction with the drawing, in which.

DETAILED DESCRIPTION OF THE INVENTION

Figure 1:
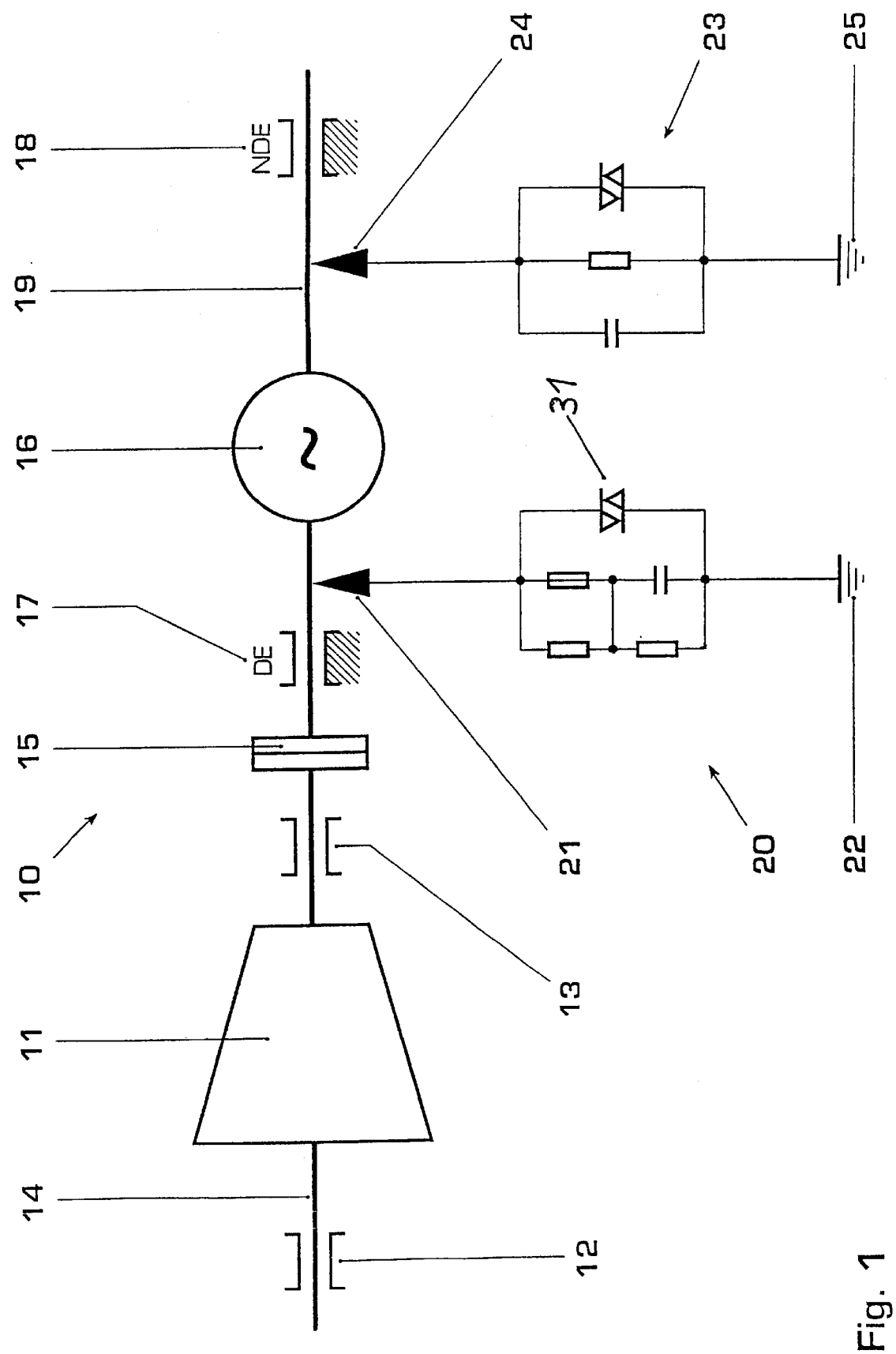
FIG. 1 shows the highly simplified construction of a turbine set having a protective and monitoring apparatus arranged at both the drive end and the non drive end, according to two preferred exemplary embodiments of the invention.

FIG. 1 shows the highly simplified construction of a turbine set having a protective and monitoring apparatus arranged at both the drive end and the non drive end, according to two preferred exemplary embodiments of the invention. The turbine set 10 has a turbine 11 which is arranged on a turbine shaft 14. The turbine shaft 14 is borne in two bearings 12 and 13 such that it can rotate. The turbine set 10 also has a generator 16, through which a generator shaft 19 passes. The generator shaft 19 is connected at the drive end DE (left-hand side of FIG. 1) via a clutch 15 to the turbine shaft 14 to form a continuous shaft run. The generator shaft 19 is borne in a respective bearing 17 or 18, such that it can rotate, at both the drive end DE and the non drive end NDE. The bearing at the non drive end NDE is normally isolated from ground, as is shown in FIG. 1 in EP-A1-0 271 678 and in FIG. 1 in DE-A1-197 42 622.

In the turbine set 10 which is shown in FIG. 1, two options are shown for how the generator shaft 19 can be equipped with a protective and monitoring apparatus: in one case, a protective and monitoring device 23 is arranged at the non drive end NDE between the bearing 18 and the generator 16 and makes a sliding electrical contact with the generator shaft 19 on one side via a contact apparatus 24, for example a copper mesh, and is connected to a grounding connection 25 on the other side. Fundamentally, this protective and monitoring apparatus 23 contains an RC parallel circuit formed by a resistance open to capacitance, as is also described in EP-A1-0 271 678. Furthermore, a measurement resistance which is connected in series with the RC parallel circuit can also be provided, although this is not shown in FIG. 1. The essential feature is a triac which bridges the RC parallel circuit when it is switched on thus rendering any high voltages which occur on the generator shaft 19 safe.

The other option is to arrange a protective and monitoring apparatus 20 between the bearing 17 and the generator 16 at the drive end DE of the generator shaft 19. In this case as well, the contact on the shaft side is produced via a (sliding) contact apparatus 21, for example a copper mesh, while the other side of the apparatus is connected to a grounding connection 22. The drive-end protective and monitoring device 20, whose circuitry is shown in more detail in FIG. 2B, likewise has an RC parallel circuit formed by a resistance 26 and a capacitance 27, which is arranged between the contact apparatus 21 and the grounding connecting 22. A pair of diodes (34), for example with a breakdown voltage of approximately 1V, is connected in parallel with the RC parallel circuit 26, 27 for voltage limiting, with a measurement resistance 30 being connected in series on the ground side and a fuse 29 being connected in series on the shaft side (2A/250V slow-acting in the example). The fuse 29 is connected in parallel with a (comparatively high-value) resistance 28. A triac 31, which bridges the series circuit when it is switched on, is connected in parallel with the series circuit formed by the measurement resistance 30, the RC parallel circuit 26, 27, the pair of diodes 34 and the parallel circuit 28, 29. This is the case when the generator shaft 19 comes into contact with a low-impedance high-voltage source (for example a power supply system voltage). The triac 31 switches on, for example, and short-circuits the entire circuit when the voltage on the circuit exceeds 32V. After switching on, the voltage between the generator shaft and ground is limited to approximately 2V, even when high currents are flowing.

Figure 2:
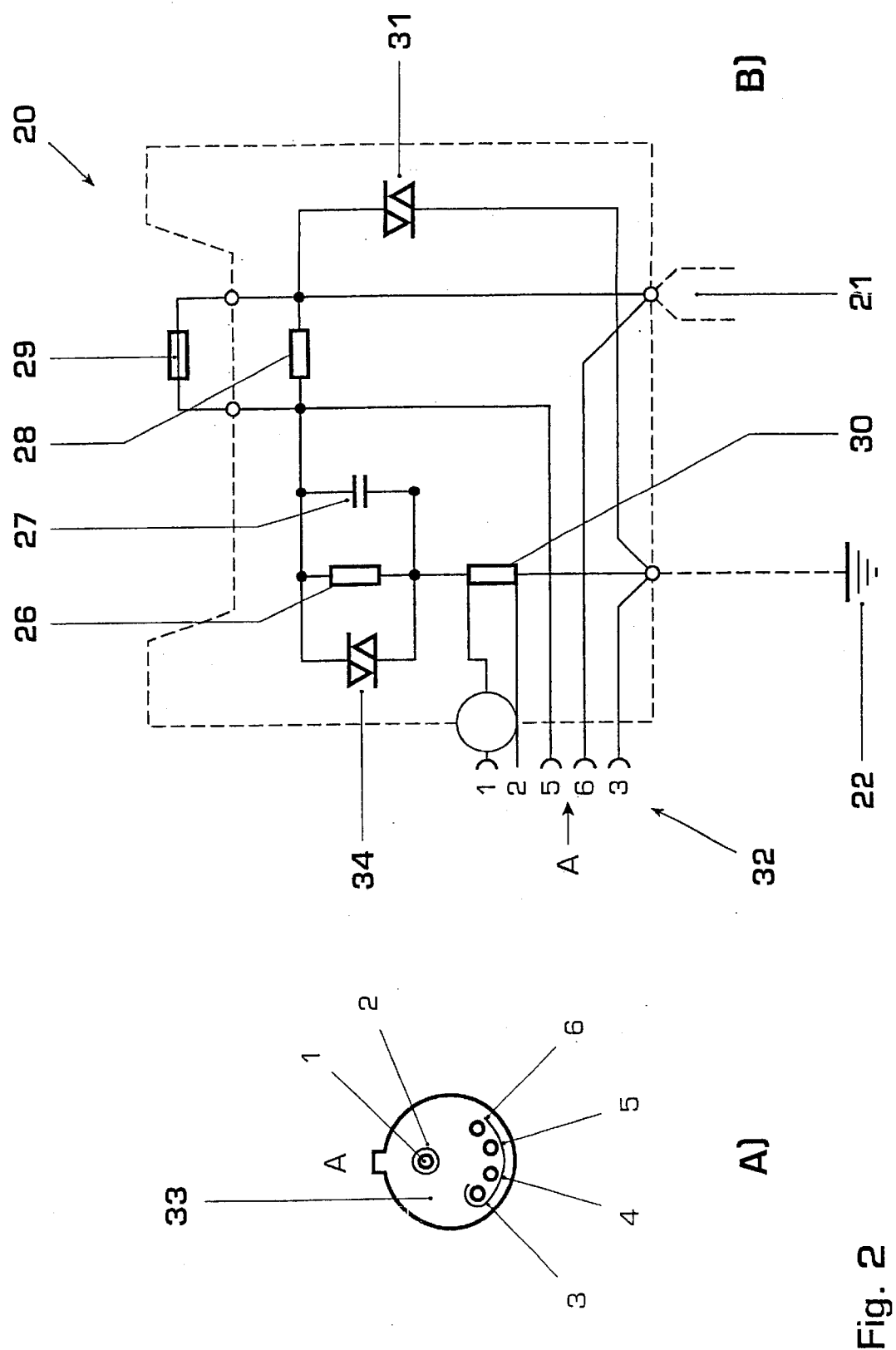
FIG. 2 uses two subfigures to show the outline circuit diagram of a protective and monitoring apparatus, such as that which is arranged at the drive end in FIG. 1 (FIG. 2A), and the wiring of the associated connecting plug (FIG. 2B).

The individual circuit elements of the protective and monitoring apparatus 20 are accommodated in a module (shown by dashed lines in FIG. 2B). The fuse 29 is arranged externally on the module, such that it can be replaced. The module can be connected via a multicore connecting cable 32 with an associated connecting plug 33 to correspondingly designed monitoring or diagnosis devices. The connections 1 and 2 are in this case part of a coaxial cable, via which the voltage which is dropped across the measurement resistance 30 as a result of the current to be measured can be measured by protective and monitoring apparatus 20. The connection 3 is used for direct connection to the grounding connection 22. The connection 6 allows a direct voltage measurement on the generator shaft 19, and the connection 5 allows a normal voltage measurement within the circuit.

The protective and monitoring apparatus 20 at the drive end of the generator shaft 19 is intended to ensure safe operation of the generator 16 in general, in particular if a metal mesh is used for grounding of the generator shaft 19. It is used especially for the following purposes:

- as a protective element, in order to minimize the risk of damage which can be caused by heavy shaft currents. During normal operation, no current should flow through the apparatus (the module 20), because the grounding easily keeps the generator shaft at a low potential. However, if the shaft has a second ground connection in parallel with the contact apparatus 21 and the metal mesh, a current will flow through the module. As soon as this current becomes excessive, the fuse 29 blows and the current is limited by the parallel resistance 28.
- as a voltage limiter, when the voltage drop across the resistance path within the module becomes excessive. In this case, the triac 31 switches on (see above).
- in order to dissipate static charges from the generator shaft. Because of the resistance 28, this is possible even when the fuse 29 has blown.
- for short-circuiting voltage pulses which are caused by the excitation system and are injected capacitively by the capacitance between the generator shaft and the rotor winding (in this context, see also EP-A1-0 271 678).
- as a current and voltage sensor for monitoring the generator or for periodic on-line measurements.
- for detection of insulation faults in the bearing 18, which is isolated from ground, at the non drive end.
- for detection of processes involving the generator shaft 19 sliding on the drive end, or along the shaft run including the turbine 10.

List of Reference Symbols
10 Turbine set
11 Turbine
12, 13 Bearings (turbine shaft)
14 Turbine shaft
15 Clutch
16 Generator
17, 18 Bearings (generator shaft)
19 Generator shaft 20, 23 Protective and monitoring apparatus (module)
21, 24 Contact apparatus (e.g. copper mesh)
22, 25 Grounding connection
26, 28 Resistance
27 Capacitance
29 Fuse
30 Measurement resistance
31 Triac
32 Connecting cable
33 Connecting plug
34 Back-to-back parallel-connected (pair of) diodes
DE Drive End
NDE Non Drive End

What is claimed is:

1. A protective and monitoring apparatus for monitoring and reducing shaft currents and shaft voltages on the generator shaft of a generator which produces electrical power, which protective and monitoring device is connected between a contact apparatus, which makes contact with the generator shaft, and a grounding connection and comprises a parallel circuit formed by a resistance and a capacitance, with one end of the parallel circuit being connected to the contact apparatus and its other end being connected to the grounding connection, wherein means are provided for bridging the parallel circuit when an overvoltage occurs.

2. The protective and monitoring apparatus as claimed in claim 1, wherein a measurement resistance is connected in series with the parallel circuit, between the parallel circuit and the grounding connection, and wherein the series of circuits formed by the measurement resistance and the parallel circuit can be bridged by the bridging means.

3. The protective and monitoring apparatus as claimed in claim 2, wherein a fuse is connected in series with the parallel circuit, between the parallel circuit and the contact apparatus, and wherein the series circuit formed from the measurement resistance, the parallel circuit and the fuse can be bridged by the bridging means.

4. The protective and monitoring apparatus as claimed in claim 3, wherein a pair of diodes is connected in parallel with the parallel circuit, and wherein the series circuit formed from the measurement resistance, the parallel circuit and the fuse can be bridged by the bridging means.

5. The protective and monitoring apparatus as claimed in claim 3, wherein the fuse has a rated value of approximately 2 A.

6. The protective and monitoring apparatus as claimed in claim 3, wherein the fuse is connected in parallel with a high-value resistance.

7. The protective and monitoring apparatus as claimed in claim 1, wherein bridging means have a controllable switching element, preferably a triac.

8. The protective and monitoring apparatus as claimed in claim 7, wherein the controllable switching element or the triac is switched on when the voltage which is dropped across the protective and monitoring apparatus exceeds approximately 32 V.

9. Use of a protective and monitoring apparatus as claimed in claim 1 for protecting and for monitoring a generator which has a drive end and a non drive end, wherein the protective and monitoring apparatus is arranged on the drive end.

10. Use as claimed in claim 9, wherein the voltage which is dropped across the protective and monitoring apparatus is limited by switching on the bridging means when said voltage exceeds a predetermined value.

11. Use as claimed in claim 9, wherein the voltage which is dropped across the protective and monitoring apparatus and/or the current which is flowing through the protective and monitoring apparatus is measured, and its waveform and the frequency distribution that occurs are evaluated.

* * * * *